United States Patent
Li (10) Patent No.: US 11,963,142 B2
(45) Date of Patent: Apr. 16, 2024

(54) SLOT FORMAT INDICATION METHOD, APPARATUS AND SYSTEM, AND DEVICE AND STORAGE MEDIUM

(71) Applicant: BEIJING XIAOMI MOBILE SOFTWARE CO., LTD., Beijing (CN)

(72) Inventor: Mingju Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 623 days.

(21) Appl. No.: 17/166,836

(22) Filed: Feb. 3, 2021

(65) Prior Publication Data

US 2021/0160862 A1    May 27, 2021

Related U.S. Application Data

(63) Continuation of application No. PCT/CN2018/098639, filed on Aug. 3, 2018.

(51) Int. Cl.
*H04W 72/0446* (2023.01)
*H04L 5/00* (2006.01)

(52) U.S. Cl.
CPC ....... *H04W 72/0446* (2013.01); *H04L 5/0078* (2013.01)

(58) Field of Classification Search
CPC . H04W 72/0446; H04W 16/14; H04W 72/23; H04W 74/0808; H04L 5/0078; H04L 5/0094; H04L 5/0057
See application file for complete search history.

(56) References Cited

U.S. PATENT DOCUMENTS

| 10,212,606 B2 | 2/2019 | Gou et al. |
| 2002/0150058 A1 | 10/2002 | Kim et al. |
| 2016/0119820 A1 | 4/2016 | Lin |
| 2017/0280331 A1 | 9/2017 | Gou et al. |
| 2017/0353866 A1 | 12/2017 | Gou et al. |
| 2018/0110057 A1 | 4/2018 | Park |
| 2018/0227156 A1 | 8/2018 | Papasakellariou |

(Continued)

FOREIGN PATENT DOCUMENTS

| CN | 102484867 A | 5/2012 |
| CN | 104301273 A | 1/2015 |

(Continued)

OTHER PUBLICATIONS

Non-Final Office Action of the U.S. Appl. No. 17/171,730, dated Sep. 21, 2023, (46p).

(Continued)

*Primary Examiner* — Ayaz R Sheikh
*Assistant Examiner* — Tarell A Hampton
(74) *Attorney, Agent, or Firm* — Arch & Lake LLP (57) ABSTRACT

Methods, apparatuses, devices, systems, and storage mediums for slot format indication are provided. The method includes sending, in response to detecting that a target channel is in an idle state, slot format indication information to UE through a target channel. The slot format indication information being configured to indicate link formats of N symbols included in a target partial slot, and N being a positive integer less than 14. The target partial slot is located in a time period during which a base station occupies the target channel, and the target channel is located on an unlicensed spectrum.

8 Claims, 5 Drawing Sheets

(56) References Cited

U.S. PATENT DOCUMENTS

| | | | | |
|---|---|---|---|---|
| 2019/0150198 A1* | 5/2019 | Sun | ...................... | H04L 5/0048 |
| | | | | 370/329 |
| 2019/0200351 A1* | 6/2019 | Sun | ...................... | H04L 5/0057 |
| 2019/0306857 A1 | 10/2019 | Lin | | |
| 2019/0313455 A1* | 10/2019 | Guey | .................. | H04W 74/006 |
| 2019/0357239 A1* | 11/2019 | Moon | .................. | H04W 76/27 |
| 2020/0037354 A1* | 1/2020 | Li | ..................... | H04W 74/0808 |
| 2020/0229231 A1 | 7/2020 | Oh | | |
| 2020/0351923 A1* | 11/2020 | Karaki | .................. | H04W 72/23 |
| 2020/0374933 A1* | 11/2020 | Lou | .................. | H04W 74/0808 |
| 2020/0404694 A1 | 12/2020 | Gao et al. | | |
| 2021/0195449 A1 | 6/2021 | Yi | | |
| 2021/0235491 A1* | 7/2021 | Iyer | ...................... | H04W 72/23 |
| 2021/0282133 A1 | 9/2021 | Parkvall | | |

FOREIGN PATENT DOCUMENTS

| | | | | |
|---|---|---|---|---|
| CN | 104363975 A | | 2/2015 | |
| CN | 105577339 A | | 5/2016 | |
| CN | 106160982 A | | 11/2016 | |
| CN | 106231614 A | | 12/2016 | |
| CN | 106793127 A | | 5/2017 | |
| CN | 107079420 A | | 8/2017 | |
| CN | 108076515 A | | 5/2018 | |
| CN | 109075956 A | | 12/2018 | |
| GB | 2575816 A | * | 1/2020 | ............ H04W 16/14 |
| JP | 2017139665 A | | 8/2017 | |
| RU | 2232472 C2 | | 7/2004 | |
| RU | 2613537 C2 | | 3/2017 | |
| WO | 2015174748 A1 | | 11/2015 | |
| WO | 2018030950 A1 | | 2/2018 | |
| WO | 2018086449 A1 | | 5/2018 | |
| WO | 2018097586 A1 | | 5/2018 | |
| WO | 2018114258 A1 | | 6/2018 | |
| WO | 2018127229 A1 | | 7/2018 | |
| WO | 2018128439 A1 | | 7/2018 | |
| WO | 2018144471 A1 | | 8/2018 | |
| WO | 2018145019 A1 | | 8/2018 | |

OTHER PUBLICATIONS

International Search Report in the International Application No. PCT/CN2018/100667, dated Apr. 29, 2019, (3p).
English translation of the Written Opinion of the International Search Authority in the International Application No. PCT/CN2018/100667, dated Apr. 29, 2019, (5p).
First Office Action of the Chinese Application No. 201880001039.1, dated Feb. 26, 2021 with English translation (14p).
Second Office Action of the Chinese Application No. 201880001039.1, dated May 8, 2021 with English translation (10p).
Mediatek Inc: "On frame structure design for NR-U operation", 3GPP Draft; R1-1808271 On Frame Structure Design for N R-U Operation, 3rd Generation Partnership Project (3GPP), Mobile Competence CENTRE:650, Route Des Lucioles: F-06921SOPHIA-ANTIPOLIS Cedex; FR, vol. RAN WG1, No. Gothenburg, Sweden;Aug. 20, 2018-Aug. 24, 2018 Aug. 11, 2018 (Aug. 11, 2018), XP051515655,paragraph [0002]—paragraph [0003], 4 pages.
TCL Communication: "Discussion on partial slot transmission in NR-U",3GPP Draft; R1-1809380 Discussion on Partial Slot Transmisston in NR-U, 3rd Generation Partnership Project (3GPP), Mobile Competence Centre: 650, Route Deslucioles; F-06921 Sophia-Antipolis Cedex, vol. RAN WG1, No. Gothenburg, Sweden;Aug. 20, 2018-Aug. 24, 2018 Aug. 10, 2018 (Aug. 10, 2018), XP051516744, paragraph [02.1]—paragraph [02.2], 7 pages.

Extended European Search Report in the European Application No. 18930058.5, dated Aug. 17, 2021, (5p).
Notice of Allowance of the Russian Application No. 2021106178, dated Aug. 27, 2021 with English translation (13p).
Xiaomi, "Discussion on the frame structure for NR-U", 3GPP TSG RAN WG1 Meeting #94 R1-1809220, Aug. 20-24, 2018, (4p).
TCL Communication, "Discussion on partial slot transmission in NR-U", 3GPP TSG RAN WG1 Meeting 94 R1-1808254, Aug. 20-24, 2018, (7p).
First Office Action of the Japanese Application No. 2021-506958, dated Mar. 18, 2022 with English translation, (7p).
Huawei, HiSilicon, "NR frame structure on unlicensed bands", 3GPP TSG RAN WG1 Meeting #93 R1-1805917, May 21-May 25, 2018, (8p).
Office Action of the Indian Application No. 202147009938, dated Feb. 3, 2022 with English translation (6p).
Second Office Action of the Japanese Application No. 2021-506958, dated Oct. 17, 2022 with English translation (5p).
Notice of Allowance of the Japanese Application No. 2021-506958, dated May 1, 2023, with English translation (5p).
English translation of the Written Opinion of the International Search Authority in the international application No. PCT/CN2018/098639, dated Apr. 19, 2019, (4p).
First Office Action of the Chinese Application No. 201880000951.5, dated Sep. 3, 2020 with English translation, (9p).
Karaki, Reem et al., "Performance of Autonomous Uplink Transmissions in Unlicensed Spectrum LTE", Dec. 30, 2017. GLOBECOM 2017-2017 IEEE Global Communications Conference, (6p).
International Search Report of PCT Application No. PCT/CN2018/098639 dated Apr. 19, 2019 with English translation (4p).
Office Action of the Indian application No. 202147008802, dated Jan. 27, 2022, (6 pages).
Huawei, HiSilicon, "Discussion and TP on slot format for ECP", 3GPP TSG-RAN WG1 Meeting #92bis, R1-1803652, Apr. 7, 2018. pages 1-9, [retrieved on Mar. 28, 2022], <URL: https://www.3gpp.org/ftp/tsg_ran/WG1_RL1/TSGR1_92b/Docs/R1-1803652.zip>, (9 pages).
LG Electronics, "Discussion on group common PDCCH", 3GPP TSG-RAN WG1 NR_AH_1801 R1-1800373, Jan. 13, 2018. pp. 1-15, [retrieved on Mar. 28, 2022], <URL: https://www.3gpp.org/ftp/tsg_ran/WG1_RL1/TSGR1_AH/NR_AH_1801/Docs/R1-1800373.zip>, (15 pages).
Nokia, Nokia Shanghai Bell, "Frame structure for NR-U operation", 3GPP TSG-RAN WG1 Meeting #93 R1-1806105. May 11, 2018. pp. 1 6, [retrieved on Mar. 28, 2022], <URL: https://www.3gpp.org/ftp/tsg_ran/WG1_RL1/TSGR1_93/Docs/R1-1806105.zip>, (6 pages).
Lenovo, Motorola Mobility, "Frame structure for NR-U operation", 3GPP TSG-RAN WG1 Meeting #93 R1-1806345, May 11, 2018. pages 1-3. [retrieved on Mar. 28, 2022], <URL: https://www.3gpp.org/ftp/tsg_ran/WG1 RL1/TSGR1_93/ Docs/R1-1806345.zip>, (3 pages).
First Office Action of the Japanese application No. 2021-505816, dated Apr. 4, 2022, (7 pages).
Mediatek Inc: "Contents of GC PDCCH", 3GPP Draft; R1-1713679 Contents of Group-Common PDCCH_Final, 3rd Generation Partnership Project (3GPP), Mobile Competence Centre; 650, Route Des Lucioles; F-06921 Sophia-Antipolis Cedex; France vol. RAN WG1, No. Prague, P.R. Czechia, Aug. 20, 2017, (4p).
Extended European Search Report in the European Application No. 18928368.2, dated Jul. 14, 2021, (8p).
First Office Action of the Russian Application No. 2021105166, dated Aug. 17, 2021, (15p).

* cited by examiner

In response to detecting that a target channel is in an idle state, a base station sends slot format indication information to UE through the target channel ~301

FIG. 3

UE receives the slot format indication information sent by the base station through the target channel ~401

FIG. 10

SLOT FORMAT INDICATION METHOD, APPARATUS AND SYSTEM, AND DEVICE AND STORAGE MEDIUM

CROSS-REFERENCE TO RELATED APPLICATION

This application is a continuation of PCT Patent Application No. PCT/CN2018/098639 filed on Aug. 3, 2018, the entire contents of which is are herein incorporated herein by reference in their entirety for all purposes.

TECHNICAL FIELD

The present disclosure relates to the technical field of wireless communications, and more particularly, to a slot format indication method, apparatus, device, system, and a storage medium.

BACKGROUND

With development of wireless communication technology, more and more communication systems can transmit communication data through a channel on an unlicensed spectrum. There may be multiple communication systems that work on an unlicensed spectrum, therefore, in consideration of fairness among multiple communication systems, a Listen Before Talk (LBT) mechanism is generally adopted for communication of a base station on an unlicensed spectrum, that is, the base station monitors a channel on the unlicensed spectrum before sending communication data. Only when detecting that a channel is idle, the base station can occupy the channel on the unlicensed spectrum to send the communication data.

In practical applications, a timing that a base station starts to occupy a channel on an unlicensed spectrum is likely to be in the middle of a full slot, that is, a partial slot is likely to exist during a time period during which the base station occupies the channel on the unlicensed spectrum. The so-called partial slot is a concept relative to a full slot. The number of symbols included in a full slot is 14, while the number of symbols included in a partial slot is less than 14.

SUMMARY

The present disclosure provides a slot format indication method, apparatus, device, system, and a storage medium.

According to a first aspect of the present disclosure, a method for slot format indication is provided. The method may include sending, in response to detecting that a target channel is in an idle state, slot format indication information to User Equipment (UE) through the target channel. The slot format indication information may be configured to indicate link formats of N symbols comprised in a target partial slot, and N may be a positive integer less than 14. The target partial slot is located in a time period during which a base station occupies the target channel, and the target channel is located on an unlicensed spectrum.

According to a second aspect of the present disclosure, a method for slot format indication is provided. The method may include receiving slot format indication information sent by a base station through a target channel. The slot format indication information may be configured to indicate link formats of N symbols comprised in a target partial slot, and N may be a positive integer less than 14. The slot format indication information is sent by the base station in response to detecting that the target channel is in an idle state, the target partial slot is in a time period during which the base station occupies the target channel, and the target channel is on an unlicensed spectrum.

According to a third aspect of the present disclosure, a computing device a computing device comprising one or more processors, a non-transitory computer-readable memory storing instructions executable by the one or more processors, wherein the one or more processors are configured to send, in response to detecting that a target channel is in an idle state, slot format indication information to UE through the target channel. The slot format indication information may be configured to indicate link formats of N symbols included in a target partial slot, and N may be a positive integer less than 14. The target partial slot is located in a time period during which a base station occupies the target channel, and the target channel is located on an unlicensed spectrum.

According to a fourth aspect of the present disclosure, a computing device comprising one or more processors, a non-transitory computer-readable memory storing instructions executable by the one or more processors, wherein the one or more processors are configured to receive slot format indication information sent by a base station through a target channel. The slot format indication information may be configured to indicate link formats of N symbols included in a target partial slot, and N may be a positive integer less than 14. The slot format indication information is sent by the base station in response to detecting that the target channel is in an idle state, the target partial slot is in a time period during which the base station occupies the target channel, and the target channel is on an unlicensed spectrum.

It is to be understood that the above general descriptions and detailed descriptions below are only examples and explanatory and not intended to limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to embodiments, examples of which are illustrated in the accompanying drawings. The following description refers to the accompanying drawings in which the same numbers in different drawings represent the same or similar elements unless otherwise represented. The implementations set forth in the following description of embodiments do not represent all implementations consistent with the present disclosure. Instead, they are merely examples of apparatuses and methods consistent with aspects related to the present disclosure as recited in the appended claims.

The terms used in the present disclosure are for the purpose of describing particular examples only and are not intended to limit the present disclosure. Terms determined by "a," "the" and "said" in their singular forms in the present disclosure and the appended claims are also intended to include a plurality, unless clearly indicated otherwise in the context. It should also be understood that the term "and/or" as used herein refers to and includes any and all possible combinations of one or more of the associated listed items.

It is to be understood that, although terms "first," "second," "third," and the like may be used in the present disclosure to describe various information, such information should not be limited to these terms. These terms are only used to distinguish one category of information from another. For example, without departing from the scope of the present disclosure, first information may be referred to as second information; and similarly, second information may also be referred as first information. Depending on the context, the word "if" as used herein may be interpreted as "when" or "upon" or "in response to determining."

In a 5th Generation Mobile Communication Technology (5G) New Radio Access Technology (NR) communication system, a full slot includes 14 symbols. A full slot format refers to link formats of each symbol included in the full slot.

The link formats of a symbol represent transmission directions of data in the symbol. In a 5G NR communication system, link formats of a symbol may be divided into three categories, that is, an uplink format (usually denoted by a letter U), a downlink format (usually denoted by a letter D), and a flexible format (usually denoted by a letter X). A symbol with the flexible format can be flexibly used for uplink transmission or downlink transmission, based on further specific configurations in different purposes.

In the symbol in the uplink format, the direction of data transmission is an uplink direction, and UE may send communication data to a base station in the symbol in the uplink format. In the symbol in the downlink format, the direction of data transmission is an downlink direction, and the UE may receive the communication data from the base station in the symbol in the downlink format. In the symbol in the flexible format, the UE is required to determine the direction of data transmission in the symbol through a further instruction from the base station, that is, the UE is required to determine, through the further instruction of the base station, whether the UE can send the communication data to the base station in the symbol, or the UE is required to determine, through the further instruction of the base station, whether the UE can receive the communication data from the base station in the symbol.

At present, a complete slot format table is defined for a 5G NR communication system, in which there are 256 formats. The first 56 full slot formats are specified, and the next 200 formats are reserved for subsequent determination. The 56 full slot formats are shown in Table 1.

TABLE 1

| Slot format index | Symbol numbers | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | X | X | X | X | X | X | X | X | X | X | X | X | X | X |
| 3 | D | D | D | D | D | D | D | D | D | D | D | D | D | X |
| 4 | D | D | D | D | D | D | D | D | D | D | D | D | X | X |
| 5 | D | D | D | D | D | D | D | D | D | D | D | X | X | X |
| 6 | D | D | D | D | D | D | D | D | D | D | X | X | X | X |
| 7 | D | D | D | D | D | D | D | D | D | X | X | X | X | X |
| 8 | X | X | X | X | X | X | X | X | X | X | X | X | X | U |
| 9 | X | X | X | X | X | X | X | X | X | X | X | X | U | U |
| 10 | X | U | U | U | U | U | U | U | U | U | U | U | U | U |
| 11 | X | X | U | U | U | U | U | U | U | U | U | U | U | U |
| 12 | X | X | X | U | U | U | U | U | U | U | U | U | U | U |
| 13 | X | X | X | X | U | U | U | U | U | U | U | U | U | U |
| 14 | X | X | X | X | X | U | U | U | U | U | U | U | U | U |
| 15 | X | X | X | X | X | X | U | U | U | U | U | U | U | U |
| 16 | D | X | X | X | X | X | X | X | X | X | X | X | X | X |
| 17 | D | D | X | X | X | X | X | X | X | X | X | X | X | X |
| 18 | D | D | D | X | X | X | X | X | X | X | X | X | X | X |
| 19 | D | X | X | X | X | X | X | X | X | X | X | X | X | U |
| 20 | D | D | X | X | X | X | X | X | X | X | X | X | X | U |
| 21 | D | D | D | X | X | X | X | X | X | X | X | X | X | U |
| 22 | D | X | X | X | X | X | X | X | X | X | X | X | U | U |
| 23 | D | D | X | X | X | X | X | X | X | X | X | X | U | U |
| 24 | D | D | D | X | X | X | X | X | X | X | X | X | U | U |
| 25 | D | X | X | X | X | X | X | X | X | X | X | U | U | U |
| 26 | D | D | X | X | X | X | X | X | X | X | X | U | U | U |
| 27 | D | D | D | X | X | X | X | X | X | X | X | U | U | U |
| 28 | D | D | D | D | D | D | D | D | D | D | D | D | X | U |
| 29 | D | D | D | D | D | D | D | D | D | D | D | X | X | U |
| 30 | D | D | D | D | D | D | D | D | D | D | X | X | X | U |
| 31 | D | D | D | D | D | D | D | D | D | D | D | X | U | U |
| 32 | D | D | D | D | D | D | D | D | D | D | X | X | U | U |
| 33 | D | D | D | D | D | D | D | D | D | X | X | X | U | U |

TABLE 1-continued

| Slot format index | Symbol numbers | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 34 | D | X | U | U | U | U | U | U | U | U | U | U | U | U |
| 35 | D | D | X | U | U | U | U | U | U | U | U | U | U | U |
| 36 | D | D | D | X | U | U | U | U | U | U | U | U | U | U |
| 37 | D | X | X | U | U | U | U | U | U | U | U | U | U | U |
| 38 | D | D | X | X | U | U | U | U | U | U | U | U | U | U |
| 39 | D | D | D | X | X | U | U | U | U | U | U | U | U | U |
| 40 | D | X | X | X | U | U | U | U | U | U | U | U | U | U |
| 41 | D | D | X | X | X | U | U | U | U | U | U | U | U | U |
| 42 | D | D | D | X | X | X | U | U | U | U | U | U | U | U |
| 43 | D | D | D | D | D | D | D | D | D | X | X | X | X | U |
| 44 | D | D | D | D | D | D | X | X | X | X | X | X | U | U |
| 45 | D | D | D | D | D | D | X | X | U | U | U | U | U | U |
| 46 | D | D | D | D | D | X | U | D | D | D | D | D | X | U |
| 47 | D | D | X | U | U | U | U | D | D | X | U | U | U | U |
| 48 | D | X | U | U | U | U | U | D | X | U | U | U | U | U |
| 49 | D | D | D | D | X | X | U | D | D | D | D | X | X | U |
| 50 | D | D | X | X | U | U | U | D | D | X | X | U | U | U |
| 51 | D | X | X | U | U | U | U | D | X | X | U | U | U | U |
| 52 | D | X | X | X | X | X | U | D | X | X | X | X | X | U |
| 53 | D | D | X | X | X | X | U | D | D | X | X | X | X | U |
| 54 | X | X | X | X | X | X | X | D | D | D | D | D | D | D |
| 55 | D | D | X | X | X | U | U | U | D | D | D | D | D | D |

As shown in Table 1, in a full slot format with Slot format index 0, the link format of each symbol is the downlink format; in a full slot format with Slot format index 1, the link format of each symbol is the uplink format; in a full slot format with Slot format index 3, the link formats of the first 13 symbols are the downlink format, and the link format of the last symbol is the flexible format.

In a 5G NR communication system, a base station may use data with a length of 8 bits to indicate a full slot format to UE. In this way, the UE may determine the link format of each symbol in the full slot according to an instruction of the base station. After determining the link formats of each symbol in the full slot, the UE may perform blind detection on a PDCCH in the symbol in the downlink format, so as to receive DCI sent to the UE by the base station through the PDCCH and receive the communication data from the base station based on scheduling of the DCI. At the same time, UE may also send the communication data to the base station in the symbol in the uplink format without requesting permission from the base station.

After determining the link format of each symbol in the full slot, the UE does not need to perform blind detection on the PDCCH in the symbol in the uplink format, nor does the UE need to request permission from the base station to send the communication data to the base station in the symbol in the uplink format. Therefore, indicating the full slot format by the base station to the UE may reduce the power consumption of the UE on one hand, and on the other hand, may reduce an uplink transmission delay of the UE.

In practical applications, a 5G NR communication system may work on an unlicensed spectrum. Under a normal condition, in a communication system working on an unlicensed spectrum, an LBT mechanism is usually adopted for communication of a base station. That is, a base station is required to monitor a channel (which is called a target channel below) on an unlicensed spectrum first before transmitting communication data and can occupy the target channel to transmit communication data only when detecting that the target channel is idle. In addition, a duration in which the base station occupies the target channel may not exceed Maximum Channel Occupancy Time (MCOT), and when the duration of occupation of the target channel reaches the MCOT, the base station is required to perform LBT again to compete for the channel.

In practical applications, the timing when a base station starts to occupy a target channel is likely to be in the middle of a full slot, and the timing when the base station ends occupying the target channel is also likely to be in the middle of a full slot.

Figure 1:
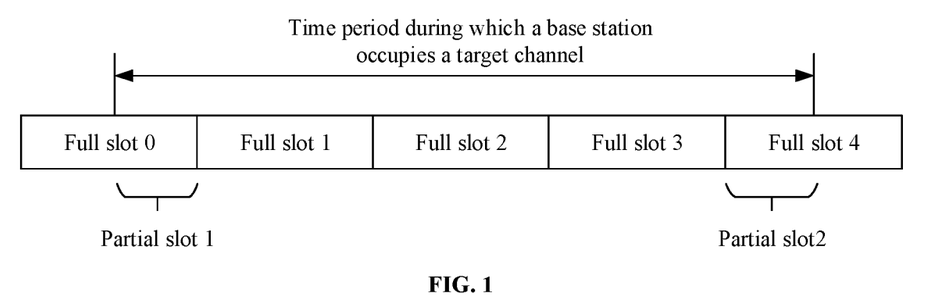
FIG. 1 is a schematic diagram illustrating slots in a time period during which a base station occupies a channel on an unlicensed spectrum, according to an example of the present disclosure.

For example, as shown in FIG. 1, the timing when the base station starts to occupy the target channel is right in the middle of the full slot 0, and the timing when the base station ends occupying the target channel is right in the middle of the full slot 4.

Both the timing when the base station starts to occupy the target channel and the timing when the base station ends occupying the target channel may be in the middle of a full slot, so a partial slot is likely to exist in a time period during which the base station occupies the target channel. The so-called partial slot is a concept relative to a full slot. In a 5G NR communication system, the number of symbols included in a partial slot is less than 14.

For example, as shown in FIG. 1, the timing when the base station starts to occupy the target channel is right in the middle of the full slot 0, and the timing when the base station ends occupying the target channel is right in the middle of the full slot 4, so the partial slot 1 and the partial slot 2 exist in the time period during which the base station occupies the target channel.

In a current communication standard, there is no definition of a format of a partial slot, and the current communication standard also does not specify a mode of indicating a partial slot. Therefore, when a partial slot exists in the time period during which the base station occupies the target channel, the UE cannot determine the link formats of the symbol in the partial slot based on the instruction of the base station. Therefore, the UE is required to perform blind detection on the PDCCH in each symbol of the partial slot. In addition, when it is necessary to send communication data to the base station in the partial slot, the UE is required to request permission of the base station and send the communication data based on the instruction of the base station, which will undoubtedly bring adverse impacts to normal communication between the base station and the UE.

Some embodiments of the present disclosure provide a slot format indication method, which may reduce adverse impacts of a partial slot on normal communication between a base station and UE.

In the slot format indication method, in response to detecting that a target channel is in an idle state, a base station may send slot format indication information to UE, the slot format indication information being configured to indicate link formats of N symbols included in a target partial slot, and the target partial slot being located in a time period during which the base station occupies the target channel. In this way, the UE may obtain the link formats of the symbols in the target partial slot based on the indication of the slot format indication information, so that the UE can send communication data to the base station through symbols in the uplink format in the target partial slot without requesting permission from the base station, and can avoid blind detection on a PDCCH in the symbols in the uplink format in the target partial slot, which may reduce power consumption and uplink transmission delay of the UE, and thus may reduce adverse impacts of the partial slot on normal communication between the base station and the UE.

An implementation environment involved in a slot format indication method provided in the embodiments of the present disclosure will be described below.

Figure 2:
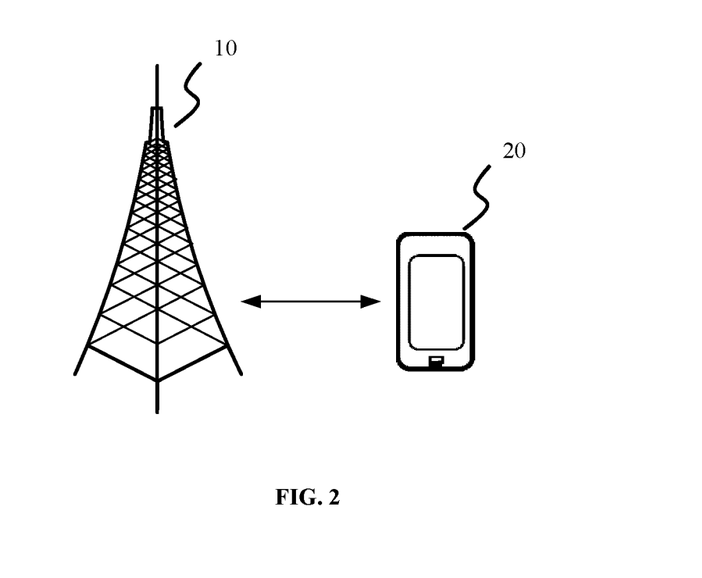
FIG. 2 is a schematic diagram illustrating an implementation environment, according to an example of the present disclosure.

FIG. 2 is a schematic diagram illustrating an implementation environment involved in a slot format indication method provided in the embodiments of the present disclosure. As shown in FIG. 2, the implementation environment may include a base station 10 and UE 20. The base station 10 may be connected with the UE 20 through a communication network. The UE 20 is any UE in a cell served by the base station 10.

The communication network may be a 5G NR communication network or another communication network similar to the 5G NR communication network.

Figure 3:
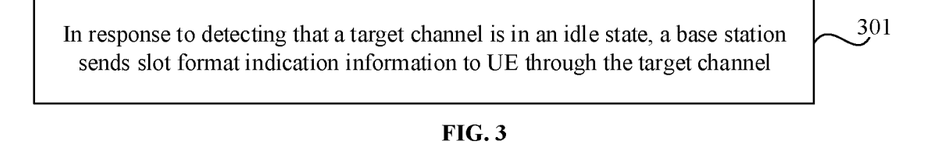
FIG. 3 is a flowchart of a slot format indication method, according to an example of the present disclosure.

FIG. 3 is a flowchart of a slot format indication method according to an embodiment. The slot format indication method may be applied in a base station 10 shown in FIG. 2. As shown in FIG. 3, the slot format indication method may include the following operations.

At operation S301, in response to detecting that a target channel is in an idle state, a base station sends slot format indication information to UE through the target channel.

The slot format indication information is configured to indicate link formats of N symbols included in a target partial slot, N being a positive integer less than 14. The target partial slot is located in a time period during which the base station occupies the target channel, and the target channel is located on an unlicensed spectrum.

In the slot format indication method provided in one or more embodiments of the present disclosure, when detecting that the target channel on the unlicensed spectrum is in an idle state, the base station may send the slot format indication information to the UE, the slot format indication information being configured to indicate link formats of N symbols included in the target partial slot, and the target partial slot being located in the time period during which the base station occupies the target channel. In this way, the UE may obtain the link formats of the symbols in the target partial slot based on the indication of the slot format indication information, so that the UE can send communication data to the base station through symbols in the uplink format in the target partial slot without requesting permission from the base station, and can avoid blind detection on the PDCCH in the symbols in the uplink format in the target partial slot, which may reduce power consumption and uplink transmission delay of the UE, and thus may reduce the adverse impacts of the partial slot on normal communication between the base station and the UE.

Figure 4:
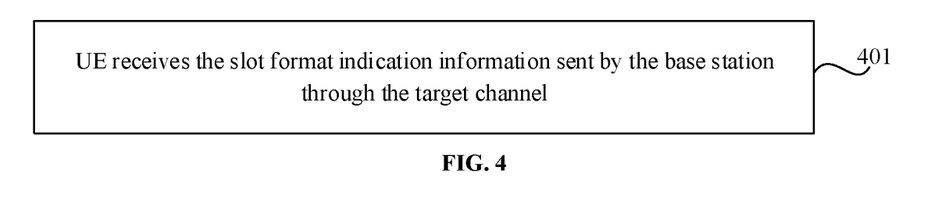
FIG. 4 is a flowchart of a slot format indication method, according to an example of the present disclosure.

FIG. 4 is a flowchart of a slot format indication method according to an embodiment. The slot format indication method may be applied in UE 20 shown in FIG. 2. As shown in FIG. 4, the slot format indication method may include the following operations.

At operation S401, the UE receives the slot format indication information sent by the base station through the target channel.

The slot format indication information is configured to indicate link formats of N symbols included in the target partial slot, N being a positive integer less than 14. The slot format indication information is sent by the base station in response to detecting that the target channel is in an idle state. The target partial slot is located in the time period during which the base station occupies the target channel, and the target channel is located on the unlicensed spectrum.

In the slot format indication method provided in one or more embodiments of the present disclosure, slot format indication information sent by a base station through a target channel may be received, the slot format indication information being configured to indicate link formats of N symbols included in a target partial slot, and the target partial slot being located in the time period during which the base station occupies the target channel. In this way, the UE may obtain the link formats of the symbols in the target partial slot based on the indication of the slot format indication information, so that the UE can send communication data to the base station through the symbols in the uplink format in the target partial slot without requesting permission from the base station, and can avoid blind detection on the PDCCH in the symbols in the uplink format in the target partial slot, which may reduce power consumption and uplink transmission delay of the UE, and thus may reduce the adverse impacts of the partial slot on normal communication between the base station and the UE.

Figure 5:
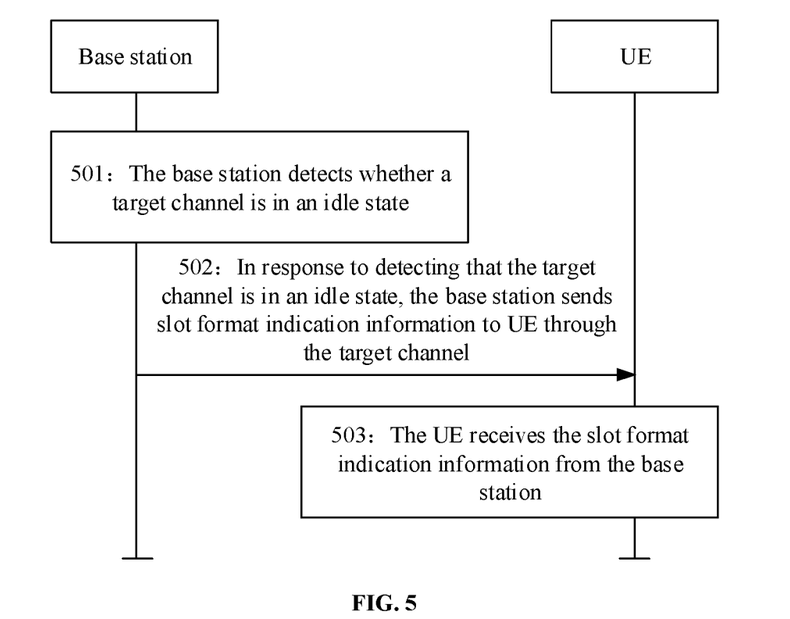
FIG. 5 is a flowchart of a slot format indication method, according to an example of the present disclosure.

FIG. 5 is a flowchart of a slot format indication method according to an embodiment. The slot format indication method may be applied in the implementation environment shown in FIG. 2. As shown in FIG. 5, the slot format indication method may include the following operations.

At operation S501, the base station detects whether the target channel is in an idle state.

As described above, in a communication system operating on an unlicensed spectrum, the base station is required to monitor a channel (namely a target channel) on the unlicensed spectrum before sending communication data, and can occupy the target channel to send the communication data only when the base station detects that the target channel is idle. Therefore, in the embodiments of the present disclosure, the base station is required to execute the technical process of the operation S501.

The situation that the target channel is in an idle state means that the target channel is not occupied. Correspondingly, the situation that the target channel is in a non-idle state means that the target channel is being occupied.

At operation S502, in response to detecting that the target channel is in an idle state, the base station sends the slot format indication information to the UE through the target channel.

In response to detecting that the target channel is in an idle state, the base station may occupy the target channel and transmit the communication data through the target channel.

In order to reduce the power consumption of the UE and reduce the uplink transmission delay of the UE, that is, in order to reduce the adverse impacts of the partial slot on normal communication between the base station and the UE, the base station may send the slot format indication information to the UE through the target channel after occupying the target channel.

The slot format indication information is configured to indicate link formats of N symbols included in the target partial slot, N being a positive integer less than 14. The target partial slot is located in the time period during which the base station occupies the target channel. For example, the target partial slot may be the partial slot 1 or the partial slot 2 shown in FIG. 1.

In one or more embodiments of the present disclosure, the base station may send the slot format indication information to the UE through the DCI. That is, in response to detecting that the target channel is in an idle state, the base station may send the DCI to the UE through the target channel, the DCI carrying the slot format indication information.

The embodiments of the present disclosure provide two manners in which the slot format indication information indicates the format of the target partial slot. The format of the target partial slot refers to the link formats of each symbol included in the target partial slot. The two manners are briefly described in the embodiments of the present disclosure.

First manner is that the slot format indication information may use the full slot format to indicate the format of the target partial slot.

As described above and shown in FIG. 1, there may be at most two target partial slots in the time period during which the base station occupies the target channel, and the two target partial slots may be respectively the first slot and the last slot in the time period during which the base station occupies the target channel.

If the target partial slot is the first slot in the time period during which the base station occupies the target channel, then the N symbols included in the target partial slot may be the last N symbols of the 14 symbols included in a full slot. If the target partial slot is the last slot in the time period during which the base station occupies the target channel, then the N symbols included in the target partial slot may be the first N symbols of the 14 symbols included in a full slot.

For example, in FIG. 1, the partial slot 1 may include 7 symbols, and the 7 symbols are the last 7 symbols of the 14 symbols included in the full slot 0. The partial slot 2 may include 7 symbols, and the 7 symbols are the first 7 symbols of the 14 symbols included in the full slot 4.

It can be seen from the above description that the N symbols included in the target partial slot may be a subset of the 14 symbols included in a full slot. Therefore, in the first indication manner provided in the embodiments of the present disclosure, a full slot format may be used for the slot format indication information to indicate the format of the target partial slot.

Optionally, when the target partial slot is the first slot in the time period during which the base station occupies the target channel, the slot format indication information may indicate that the link formats of the N symbols included in the target partial slot are the same as link formats of last N symbols of the 14 symbols included in the first full slot.

For example, the format of the first full slot may be the full slot format with Slot format index 3 in Table 1, then the slot format indication information may indicate that the link formats of the N symbols included in the target partial slot are the same as link formats of last N symbols in the format of the first full slot with Slot format index 3. As shown in Table 1, when N is 3, the link formats of the N (3) symbols included in the target partial slot that is indicated by the slot format indication information are D (downlink format), D (downlink format) and X (flexible format) respectively.

In this case, the slot format indication information may include first symbol quantity indication information and first full slot format indication information.

The first symbol quantity indication information is configured to indicate the N (namely the number of symbols included in the target partial slot), the first full slot format indication information is configured to indicate the link formats (namely the format of the first full slot) of the 14 symbols included in the first full slot.

In one or more embodiments of the present disclosure, the length of the first symbol quantity indication information may be 4 bits, and the length of the first full slot format indication information may be 8 bits.

Optionally, when the target partial slot is the last slot in the time period during which the base station occupies the target channel, the slot format indication information may indicate that the link formats of the N symbols included in the target partial slot are the same as the link formats of the first N symbols of the 14 symbols included in the second full slot.

For example, the format of the first full slot may be the full slot format with Slot format index 10 in Table 1, then the slot format indication information may indicate that the link formats of the N symbols included in the target partial slot are the same as the link formats of the first N symbols in the format of the first full slot with Slot format index 10. As shown in Table 1, when N is 3, the link formats of the N (3) symbols included in the target partial slot that is indicated by the slot format indication information are X (flexible format), U (uplink format) and U (uplink format) respectively.

In this case, the slot format indication information may include second symbol quantity indication information and second full slot format indication information.

The second symbol quantity indication information is configured to indicate the N (namely the number of symbols included in the target partial slot), the second full slot format indication information is configured to indicate the link formats (namely the second full slot format) of the 14 symbols included in the second full slot.

In one or more embodiments of the present disclosure, the length of the second symbol quantity indication information may be 4 bits, and the length of the second full slot format indication information may be 8 bits.

Optionally, when the target partial slot is the first or the last slot in the time period during which the base station occupies the target channel, the slot format indication information may also indicate that the link formats of the N symbols included in the target partial slot are the same as the link formats of the consecutive N symbols of the 14 symbols included in the third full slot.

The "consecutive N symbols" here may be any consecutive N symbols other than the first and the last N symbols of the 14 symbols included in the third full slot.

For example, the format of the third full slot may be the full slot format with Slot format index 10 in Table 1, then the slot format indication information may indicate that the link formats of the N symbols included in the target partial slot are the same as the link formats of consecutive N symbols, in which the symbol with number 2 is the first symbol, in the full slot format with Slot format index 12. As shown in Table 1, when N is 3, the link formats of the N (3) symbols included in the target partial slot that is indicated by the slot format indication information are X (flexible format), U (uplink format) and U (uplink format) respectively.

In this case, the slot format indication information may include third symbol quantity indication information, third full slot format indication information and first starting position indication information.

The third symbol quantity indication information is configured to indicate the N (namely the number of symbols included in the target partial slot), the third full slot format indication information is configured to indicate the link formats (namely the format of the third full slot) of the 14 symbols included in the third full slot, and the first starting position indication information is configured to indicate a position, in the third full slot, of a first symbol of the consecutive N symbols.

In one or more embodiments of the present disclosure, the length of the third symbol quantity indication information may be 4 bits, the length of the third full slot format indication information may be 8 bits, the length of the first starting position indication information may be 4 bits.

Optionally, in the embodiments of the present disclosure, the third symbol quantity indication information and the first starting position indication information may give indication jointed.

It is to be noted that in the first manner, the format of the first full slot, the format of the second full slot and the format of the third full slot may all be one of 56 full slot formats defined in the 5G NR communication system, which is not specifically limited in the embodiments of the present disclosure.

Second manner is that a target format identifier may be used for the slot format indication information to directly indicate the format of the target partial slot.

In such a manner, both the base station and the UE may maintain a slot format table which may be preset by a 5G NR communication system. For example, the slot format table may be specified by a communication standard, or may also be generated by the base station and sent to the UE.

At least one corresponding relationship between a format identifier and an link format sequence may be stored in the slot format table. The link format sequence may include link formats of M symbols, M being a positive integer in a target set of positive integers. The target set of positive integers may include at least one positive integer less than 14, and the N exists in the target set of positive integers.

For example, N may be 3, and the target set of positive integers may include 3 positive integers, which are respectively 2, 3 and 4 (3 exists in the target set of positive integers), then the slot format table may be shown in Table 2.

TABLE 2

| Format identifiers | Link format sequences |
|---|---|
| a1 | DDD |
| a2 | DU |
| a3 | DDUX |
| a4 | UUX |
| a5 | UDXX |

As shown in Table 2, the link format sequence in the slot format table may include link formats of 2 symbols, link formats of 3 symbols or link formats of 4 symbols. 2, 3 and 4 are all positive integers included in the target set of positive integers.

In such a manner, the slot format indication information may include the target format identifier, then the link formats of the N symbols included in the target partial slot may be link formats of N symbols included in a target link format sequence corresponding to the target format identifier in the slot format table.

For example, the slot format indication information may include the target format identifier a1, and the target link format sequence corresponding to the target format identifier a1 in the slot format table show in Table 2 is "DDD", then the link formats of N (3) symbols included in the target partial slot may be D (downlink format), D (downlink format) and D (downlink format) respectively.

In a possible implementation, the link formats of the M symbols included in the link format sequence in the slot format table may be the same as link formats of consecutive M symbols in 14 symbols included in a fourth full slot.

The format of the fourth full slot may be one of 56 full slot formats defined in the 5G NR communication system.

In another possible implementation, the link formats of the M symbols included in the link format sequence in the slot format table may be different from link formats of any consecutive M symbols in any full slot.

The format of any full slot is one of 56 full slot formats defined in the 5G NR communication system.

In the implementation, the target link format sequence corresponding to the target format identifier may be composed of link formats of R symbols, R being a positive integer greater than N and less than 14, while link formats of N symbols included in the target partial slot are the same as the link formats of consecutive N symbols in the target link format sequence.

Optionally, in the implementation, the slot format indication information may also include fourth symbol quantity indication information and second starting position indication information except the target format identifier.

The fourth symbol quantity indication information is configured to indicate the N, and the second starting position indication information is configured to indicate a position, in the R symbols, of a first symbol of the consecutive N symbols included in the target link format sequence.

At operation S503, the UE receives the slot format indication information from the base station.

In the slot format indication method provided in one or more embodiments of the present disclosure, in response to detecting that a target channel on an unlicensed spectrum is in an idle state, a base station may send slot format indication information to UE, the slot format indication information being configured to indicate link formats of N symbols included in a target partial slot, and the target partial slot being located in the time period during which the base station occupies the target channel. In this way, the UE may obtain the link formats of the symbols in the target partial slot based on the indication of the slot format indication information, so that the UE can send communication data to the base station through the symbols in the uplink format in the target partial slot without requesting permission from the base station, and can avoid blind detection on the PDCCH in the symbols in the uplink format in the target partial slot, which may reduce power consumption and uplink transmission delay of the UE, and thus may reduce the adverse impacts of the partial slot on normal communication between the base station and the UE.

Figure 6:
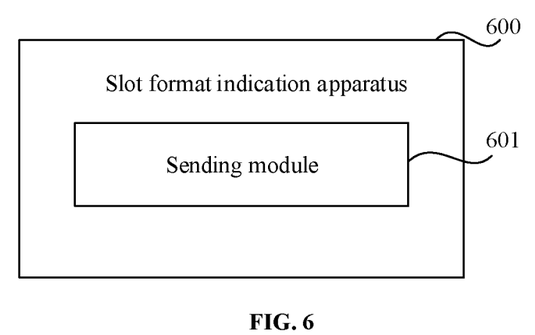
FIG. 6 is a block diagram of a slot format indication apparatus, according to an example of the present disclosure.

FIG. 6 is a block diagram of a slot format indication apparatus 600 according to an embodiment. The slot format indication apparatus 600 may be arranged in the base station 10 shown in FIG. 2. Referring to FIG. 6, the slot format indication apparatus 600 may include a sending module 601.

The sending module 601 is configured to, in response to detecting that the target channel is in an idle state, send the slot format indication information to the UE through the target channel.

The slot format indication information is configured to indicate link formats of N symbols included in the target partial slot, N being a positive integer less than 14. The target partial slot is located in the time period during which the base station occupies the target channel, and the target channel is located on the unlicensed spectrum.

In one or more embodiments of the present disclosure, when the target partial slot is the first slot in the time period during which the base station occupies the target channel, the slot format indication information is configured to indicate that the link formats of the N symbols included in the target partial slot are the same as link formats of last N symbols of the 14 symbols included in the first full slot.

In one or more embodiments of the present disclosure, the slot format indication information may include the first symbol quantity indication information and the first full slot format indication information. The first symbol quantity indication information is configured to indicate the N, and the first full slot format indication information is configured to indicate the link formats of the 14 symbols included in the first full slot.

In one or more embodiments of the present disclosure, the target partial slot may be the last slot in the time period during which the base station occupies the target channel, the slot format indication information is configured to indicate that the link formats of the N symbols included in the target partial slot are the same as the link formats of the first N symbols of the 14 symbols included in the second full slot.

In one or more embodiments of the present disclosure, the slot format indication information may include the second symbol quantity indication information and the second full slot format indication information. The second symbol quantity indication information is configured to indicate the N, and the second full slot format indication information is configured to indicate the link formats of the 14 symbols included in the second full slot.

In one or more embodiments of the present disclosure, the slot format indication information is configured to indicate that the link formats of the N symbols included in the target partial slot are the same as link formats of consecutive N symbols in 14 symbols included in a third full slot.

In one or more embodiments of the present disclosure, the slot format indication information may include the third symbol quantity indication information, the third full slot format indication information and the first starting position indication information. The third symbol quantity indication information is configured to indicate the N, the third full slot format indication information is configured to indicate link formats of 14 symbols included in the third full slot, and the first starting position indication information is configured to indicate a position, in the third full slot, of a first symbol of the consecutive N symbols.

In one or more embodiments of the present disclosure, the slot format indication information may include the target format identifier. The link formats of the N symbols included in the target partial slot are link formats of N symbols included in the target link format sequence corresponding to the target format identifier in the slot format table. The at least one corresponding relationship between a format identifier and an link format sequence may be stored in the slot format table. The link format sequence may include link formats of M symbols, M being a positive integer in a target set of positive integers. The target set of positive integers may include at least one positive integer less than 14, and the N exists in the target set of positive integers.

In one or more embodiments of the present disclosure, the link formats of the M symbols included in the link format sequence may be the same as link formats of consecutive M symbols in 14 symbols included in a fourth full slot.

In one or more embodiments of the present disclosure, the link formats of the M symbols included in the link format sequence may be different from link formats of any consecutive M symbols in any full slot.

In one or more embodiments of the present disclosure, the target link format sequence may be composed of link formats of R symbols, R being a positive integer greater than N and less than 14; link formats of N symbols included in the target partial slot may be the same as the link formats of consecutive N symbols in the target link format sequence.

In one or more embodiments of the present disclosure, the slot format indication information further may include fourth symbol quantity indication information and second starting position indication information; the fourth symbol quantity indication information is configured to indicate the N, and the second starting position indication information is configured to indicate a position, in the R symbols, of a first symbol of the consecutive N symbols.

In one or more embodiments of the present disclosure, the sending module 601 may be specifically configured to send the DCI to the UE through the target channel, the DCI carrying the slot format indication information.

With the slot format indication apparatus provided in one or more embodiments of the present disclosure, in response to detecting that a target channel on an unlicensed spectrum is in an idle state, a base station may send slot format indication information to UE, the slot format indication information being configured to indicate link formats of N symbols included in a target partial slot, and the target partial slot being located in a time period during which the base station occupies the target channel. In this way, the UE may obtain the link formats of the symbols in the target partial slot based on the indication of the slot format indication information, so that the UE can send communication data to the base station through the symbols in the uplink format in the target partial slot without requesting permission from the base station, and can avoid blind detection on a PDCCH in the symbols in the uplink format in the target partial slot, which may reduce power consumption and uplink transmission delay of the UE, and thus may reduce the adverse impacts of the partial slot on normal communication between the base station and the UE.

With respect to the apparatus in the above embodiment, the specific manners for performing operations for individual modules therein have been described in detail in the embodiment regarding the method, which will not be elaborated herein.

Figure 7:
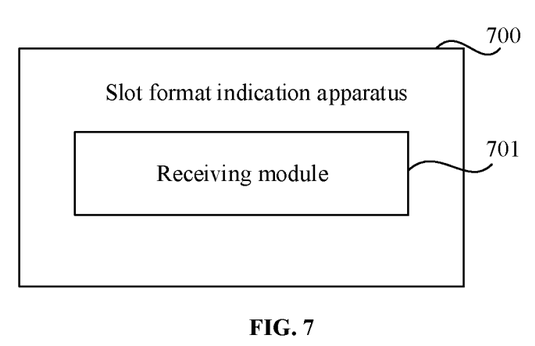
FIG. 7 is a block diagram of a slot format indication apparatus, according to an example of the present disclosure.

FIG. 7 is a block diagram of a slot format indication apparatus 700 according to an embodiment. The slot format indication apparatus 700 may be arranged in the UE 20 shown in FIG. 2. Referring to FIG. 7, the slot format indication apparatus 700 may include a receiving module 701.

The receiving module 701 is configured to receive the slot format indication information sent by the base station through the target channel.

The slot format indication information is configured to indicate link formats of N symbols included in the target partial slot, N being a positive integer less than 14. The slot format indication information is sent by the base station in response to detecting that the target channel is in an idle state. The target partial slot is located in the time period during which the base station occupies the target channel, and the target channel is located on the unlicensed spectrum.

In one or more embodiments of the present disclosure, the target partial slot may be the first slot in the time period during which the base station occupies the target channel, the slot format indication information is configured to indicate that the link formats of the N symbols included in the target partial slot are the same as link formats of last N symbols of the 14 symbols included in the first full slot.

In one or more embodiments of the present disclosure, the slot format indication information may include first symbol quantity indication information and first full slot format indication information. The first symbol quantity indication information is configured to indicate the N, and the first full slot format indication information is configured to indicate the link formats of the 14 symbols included in the first full slot.

In one or more embodiments of the present disclosure, the target partial slot may be the last slot in the time period during which the base station occupies the target channel, the slot format indication information is configured to indicate that the link formats of the N symbols included in the target partial slot are the same as the link formats of the first N symbols of the 14 symbols included in the second full slot.

In one or more embodiments of the present disclosure, the slot format indication information may include the second symbol quantity indication information and the second full slot format indication information. The second symbol quantity indication information is configured to indicate the N, and the second full slot format indication information is configured to indicate the link formats of the 14 symbols included in the second full slot.

In one or more embodiments of the present disclosure, the slot format indication information is configured to indicate that the link formats of the N symbols included in the target partial slot are the same as link formats of consecutive N symbols in 14 symbols included in a third full slot.

In one or more embodiments of the present disclosure, the slot format indication information may include third symbol quantity indication information, third full slot format indication information and first starting position indication information. The third symbol quantity indication information is configured to indicate the N, the third full slot format indication information is configured to indicate link formats of 14 symbols included in the third full slot, and the first starting position indication information is configured to indicate a position, in the third full slot, of a first symbol of the consecutive N symbols.

In one or more embodiments of the present disclosure, the slot format indication information may include a target format identifier. The link formats of the N symbols included in the target partial slot may be link formats of N symbols included in the target link format sequence corresponding to the target format identifier in the slot format table. At least one corresponding relationship between a format identifier and an link format sequence may be stored in the slot format table. The link format sequence may include link formats of M symbols, M being a positive integer in the target set of positive integers. The target set of positive integers may include at least one positive integer less than 14, and the N exists in the target set of positive integers.

In one or more embodiments of the present disclosure, the link formats of the M symbols included in the link format sequence may be the same as link formats of consecutive M symbols in 14 symbols included in the fourth full slot.

In one or more embodiments of the present disclosure, the link formats of the M symbols included in the link format sequence may be different from link formats of any consecutive M symbols in any full slot.

In one or more embodiments of the present disclosure, the target link format sequence may be composed of link formats of R symbols, R being a positive integer greater than N and less than 14. Link formats of N symbols included in the target partial slot may be the same as the link formats of consecutive N symbols in the target link format sequence.

In one or more embodiments of the present disclosure, the slot format indication information further may include fourth symbol quantity indication information and second starting position indication information. The fourth symbol quantity indication information is configured to indicate the N, and the second starting position indication information is configured to indicate a position, in the R symbols, of a first symbol of the consecutive N symbols.

In one or more embodiments of the present disclosure, the receiving module 701 may be specifically configured to receive the DCI sent by the base station through the target channel, the DCI carrying the slot format indication information.

With the slot format indication apparatus provided in one or more embodiments of the present disclosure, slot format indication information sent by a base station through a target channel may be received, the slot format indication information being configured to indicate link formats of N symbols included in a target partial slot, and the target partial slot being located in a time period during which the base station occupies the target channel. In this way, UE may obtain the link formats of the symbols in the target partial slot based on the indication of the slot format indication information, so that the UE can send communication data to the base station through the symbols in the uplink format in the target partial slot without requesting permission from the base station, and can avoid blind detection on the PDCCH in the symbols in the uplink format in the target partial slot, which may reduce power consumption and uplink transmission delay of the UE, and thus may reduce the adverse impacts of the partial slot on normal communication between the base station and the UE.

With respect to the apparatus in the above embodiment, the specific manners for performing operations for individual modules therein have been described in detail in the embodiment regarding the method, which will not be elaborated herein.

Figure 8:
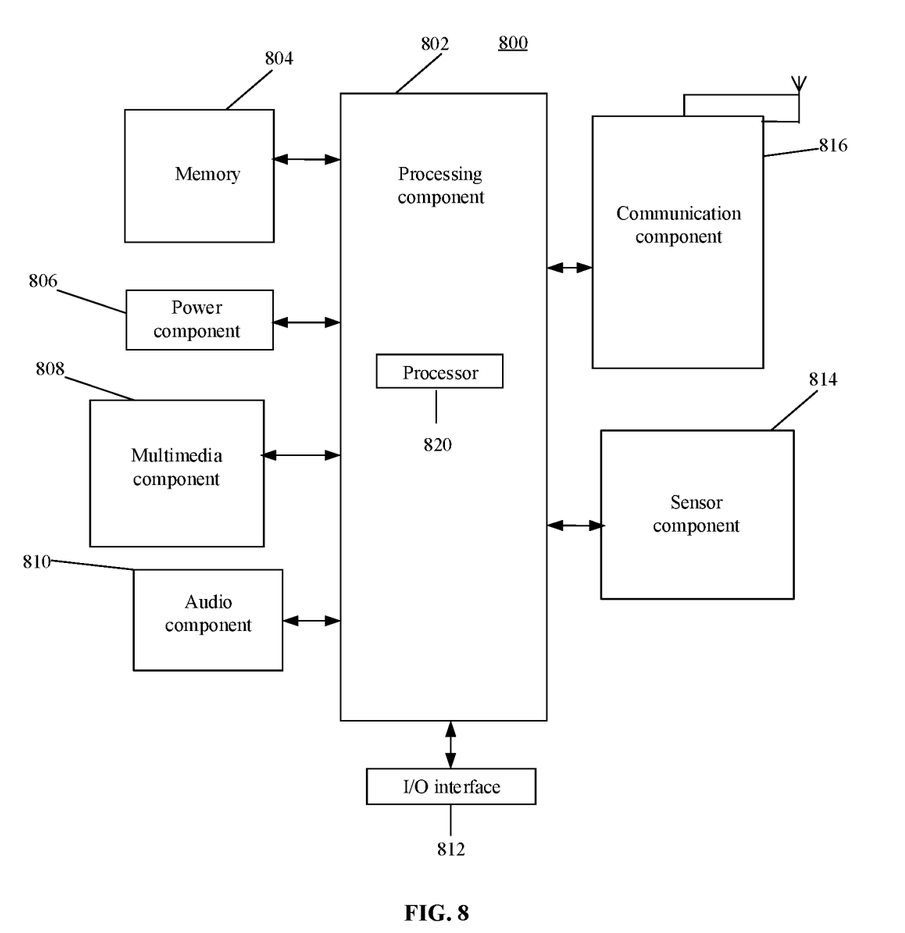
FIG. 8 is a block diagram of a slot format indication apparatus, according to an example of the present disclosure.

FIG. 8 is a block diagram of a slot format indication apparatus 800 according to an embodiment. For example, the apparatus 800 may be a mobile phone, a computer, a digital broadcast terminal, a messaging apparatus, a gaming console, a tablet, a medical apparatus, exercise device and a personal digital assistant.

Referring to FIG. 8, the apparatus 800 may include one or more of the following components: a processing component 802, a memory 804, a power component 806, a multimedia component 808, an audio component 810, an Input/Output (I/O) interface 812, a sensor component 814, and a communication component 816.

The processing component 802 typically controls overall operations of the apparatus 800, such as the operations associated with display, telephone calls, data communications, camera operations, and recording operations. The processing component 802 may include one or more processors 820 to execute instructions to perform all or part of the operations executed by the UE 20 in the above method embodiment. Moreover, the processing component 802 may include one or more modules which facilitate interaction between the processing component 802 and the other components. For instance, the processing component 802 may include a multimedia module to facilitate interaction between the multimedia component 808 and the processing component 802.

The memory 804 is configured to store various types of data to support the operation of the apparatus 800. Examples of such data include instructions for any application programs or methods operated on the apparatus 800, contact data, phonebook data, messages, pictures, video, etc. The memory 804 may be implemented by any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power component 806 provides power for various components of the apparatus 800. The power component 806 may include a power management system, one or more power supplies, and other components associated with generation, management and distribution of power for the apparatus 800.

The multimedia component 808 may include a screen providing an output interface between the apparatus 800 and a user. In some embodiments, the screen may include a Liquid Crystal Display (LCD) and a Touch Panel (TP). If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action but also detect a duration and pressure associated with the touch or swipe action. In some embodiments, the multimedia component 808 may include a front camera and/or a rear camera. The front camera and/or the rear camera may receive external multimedia data when the apparatus 800 is in an operation mode, such as a photographing mode or a video mode. Each of the front camera and the rear camera may be a fixed optical lens system or have focusing and optical zooming capabilities.

The audio component 810 is configured to output and/or input an audio signal. For example, the audio component 810 may include a Microphone (MIC), and the MIC is configured to receive an external audio signal when the apparatus 800 is in the operation mode, such as a call mode, a recording mode and a voice recognition mode. The received audio signal may further be stored in the memory 804 or sent through the communication component 816. In some embodiments, the audio component 810 further may include a speaker configured to output the audio signal.

The I/O interface 812 provides an interface between the processing component 802 and a peripheral interface module, and the peripheral interface module may be a keyboard, a click wheel, a button and the like. The button may include, but not limited to: a home button, a volume button, a starting button and a locking button.

The sensor component 814 may include one or more sensors configured to provide status assessment in various aspects for the apparatus 800. For instance, the sensor component 814 may detect an on/off status of the apparatus 800 and relative positioning of components, such as a display and small keyboard of the apparatus 800, and the sensor component 814 may further detect a change in a position of the apparatus 800 or a component of the apparatus 800, presence or absence of contact between the user and the apparatus 800, orientation or acceleration/deceleration of the apparatus 800 and a change in temperature of the apparatus 800. The sensor component 814 may include a proximity sensor configured to detect presence of an object nearby without any physical contact. The sensor component 814 may also include a light sensor, such as a Complementary Metal Oxide Semiconductor (CMOS) or Charge Coupled Device (CCD) image sensor, configured for use in an imaging application. In some embodiments, the sensor component 814 may also include an acceleration sensor, a gyroscope sensor, a magnetic sensor, a pressure sensor or a temperature sensor.

The communication component 816 is configured to facilitate wired or wireless communication between the apparatus 800 and another apparatus. The apparatus 800 may access a communication-standard-based wireless network, such as a Wireless Fidelity (Wi-Fi) network, a 2nd-Generation (2G) or 3rd-Generation (3G) network or a combination thereof. In one or more embodiments, the communication component 816 receives a broadcast signal or broadcast associated information from an external broadcast management system through a broadcast channel. In one or more embodiments, the communication component 816 further may include a Near Field Communication (NFC) module to facilitate short-range communication. For example, the NFC module may be implemented based on a Radio Frequency Identification (RFID) technology, an Infrared Data Association (IrDA) technology, an Ultra-WideBand (UWB) technology, a BLUETOOTH (BT) technology and another technology.

In one or more embodiments, the apparatus 800 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is configured to execute the technical process performed by the UE 20 in the above method embodiment.

In one or more embodiments, there is also provided a non-transitory computer-readable storage medium including an instruction, such as the memory 804 including an instruction, and the instruction may be executed by the processor 820 of the apparatus 800 to complete the technical process performed by the UE 20 in the above method embodiment. For example, the non-transitory computer-readable storage medium may be a ROM, a Random Access Memory (RAM), a Compact Disc Read-Only Memory (CD-ROM), a magnetic tape, a floppy disc, an optical data storage device and the like.

Figure 9:
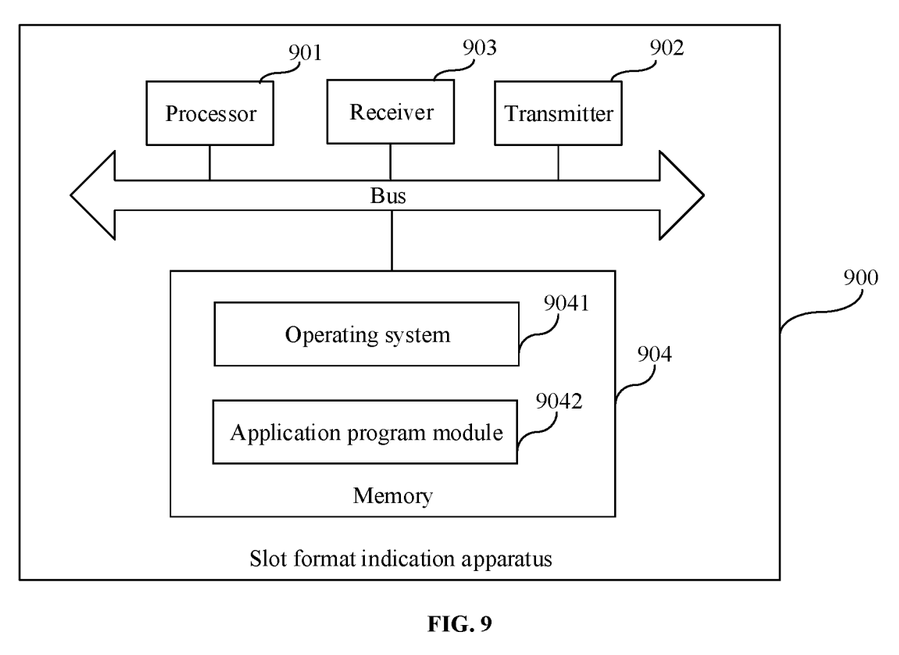
FIG. 9 is a block diagram of a slot format indication apparatus, according to an example of the present disclosure.

FIG. 9 is a block diagram of a slot format indication apparatus 900 according to an embodiment. For example, the slot format indication apparatus 900 may be a base station. As shown in FIG. 9, the slot format indication apparatus 900 may include a processor 901, a receiver 902, a transmitter 903 and a memory 904. The receiver 902, the transmitter 903 and the memory 904 are connected with the processor 901 through a bus respectively.

The processor 901 may include one or more than one processing core, and the processor 901 runs a software program and a module to execute the method executed by the base station in the slot format indication methods provided in the embodiments of the present disclosure. The memory 904 may be configured to store the software program and the module. Specifically, the memory 904 may store an operating system 9041 and an application program module 9042 required by at least one function. The receiver 902 is configured to receive communication data sent by another apparatus, and the transmitter 903 is configured to send communication data to the other apparatus.

Figure 10:
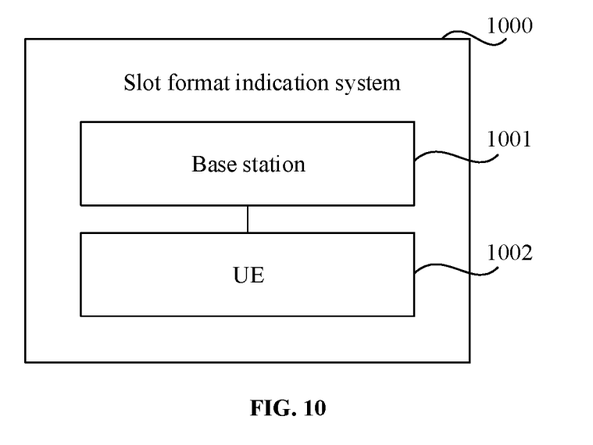
FIG. 10 is a block diagram of a slot format indication system, according to an example of the present disclosure.

FIG. 10 is a block diagram of a slot format indication system 1000 according to an embodiment. As shown in FIG. 10, the slot format indication system 1000 may include a base station 1001 and UE 1002.

The base station 1001 is configured to execute the slot format indication method executed by a base station in the embodiment shown in FIG. 5.

The UE 1002 is configured to execute the slot format indication method executed by UE in the embodiment shown in FIG. 5.

In one or more embodiments, there is also provided a computer-readable storage medium. The computer-readable storage medium is a non-volatile computer-readable storage medium. A computer program is stored in the computer-readable storage medium. The stored computer program is executed by a processing component to implement the slot format indication methods provided in the embodiments of the present disclosure.

The embodiments of the present disclosure also provide a computer program product, in which an instruction is stored. When the instruction runs in a computer, the computer may execute the slot format indication method provided in the embodiments of the present disclosure.

The embodiments of the present disclosure also provide a chip, which may include a programmable logic circuit and/or a program instruction and may run to execute the slot format indication methods provided in the embodiments of the present disclosure.

The technical improvements provided in the embodiments of the present disclosure at least may have the following beneficial impacts.

In response to detecting by a base station that a target channel on an unlicensed spectrum is in an idle state, slot format indication information may be sent to UE through the target channel, the slot format indication information being configured to indicate link formats of N symbols included in a target partial slot, and the target partial slot being located in a time period during which the base station occupies the target channel. In this way, the UE may obtain the link formats of the symbols in the target partial slot based on the indication of the slot format indication information, so that the UE can send communication data to the base station through the symbols in the uplink format in the target partial slot without requesting permission from the base station, and can avoid blind detection on a Physical Downlink Control Channel (PDCCH) in the symbols in the uplink format in the target partial slot, which can reduce power consumption and uplink transmission delay of the UE, and thus can reduce adverse impacts of the partial slot on normal communication between the base station and the UE.

Other implementation improvements of the present disclosure will be apparent to those skilled in the art from consideration of the specification and practice of the present disclosure. This present disclosure is intended to cover any variations, uses, or adaptations of the present disclosure following the general principles thereof and including such departures from the present disclosure as come within known or customary practice in the art. It is intended that the specification and examples be considered as examples only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

What is claimed is:

1. A method for slot format indication, comprising:
sending, in response to detecting that a target channel is in an idle state, slot format indication information to User Equipment (UE) through the target channel, wherein the slot format indication information is configured to indicate link formats of each of N symbols comprised in a target partial slot, and N is a positive integer less than 14, wherein the N symbols comprised in the target partial slot are a subset of 14 symbols comprised in a full slot;
wherein the target partial slot is located in a time period during which a base station occupies the target channel, and the target channel is located on an unlicensed spectrum,
wherein the target partial slot is a last slot in the time period during which the base station occupies the target channel, and
the slot format indication information is configured to indicate that the link formats of each of the N symbols comprised in the target partial slot are the same as link formats of each of first N symbols in 14 symbols comprised in a last full slot.

2. The method of claim 1, wherein the slot format indication information comprises symbol quantity indication information and full slot format indication information;
wherein the symbol quantity indication information is configured to indicate the N, and the full slot format indication information is configured to indicate link formats of each of the 14 symbols comprised in the last full slot.

3. The method of claim 1, wherein sending the slot format indication information to the UE through the target channel comprises:
sending Downlink Control Information (DCI) to the UE through the target channel, wherein the DCI carries the slot format indication information.

4. A method for slot format indication, comprising:
receiving slot format indication information sent by a base station through a target channel, the slot format indication information is configured to indicate link formats of each of N symbols comprised in a target partial slot, and N is a positive integer less than 14, wherein the N symbols comprised in the target partial slot are a subset of 14 symbols comprised in a full slot;
wherein the slot format indication information is sent by the base station in response to detecting that the target channel is in an idle state, the target partial slot is in a time period during which the base station occupies the target channel, and the target channel is on an unlicensed spectrum,
wherein the target partial slot is a last slot in the time period during which the base station occupies the target channel, and
the slot format indication information is configured to indicate that the link formats of each of the N symbols comprised in the target partial slot are the same as link formats of each of first N symbols in 14 symbols comprised in a last full slot.

5. The method of claim 4, wherein the slot format indication information comprises symbol quantity indication information and full slot format indication information;

wherein the symbol quantity indication information is configured to indicate the N, and the full slot format indication information is configured to indicate link formats of each of the 14 symbols comprised in the last full slot.

6. The method of claim 4, wherein receiving the slot format indication information sent by the base station through the target channel comprises:
receiving Downlink Control Information (DCI) sent by the base station through the target channel, wherein the DCI carries the slot format indication information.

7. A computing device, comprising:
one or more processors; and
a non-transitory computer-readable storage medium for storing a plurality of instructions executable by the one or more processors;
wherein the one or more processors are configured to implement operations of the slot format indication method according to claim 1.

8. A user equipment, comprising:
one or more processors; and
a non-transitory computer-readable storage medium for storing a plurality of instructions executable by the one or more processors;
wherein the one or more processors are configured to:
receive slot format indication information sent by a base station through a target channel, the slot format indication information is configured to indicate link formats of each of N symbols comprised in a target partial slot, and N is a positive integer less than 14, wherein the N symbols comprised in the target partial slot are a subset of 14 symbols comprised in a full slot;
wherein the slot format indication information is sent by the base station in response to detecting that the target channel is in an idle state, the target partial slot is in a time period during which the base station occupies the target channel, and the target channel is on an unlicensed spectrum,
wherein the target partial slot is a last slot in the time period during which the base station occupies the target channel, and
the slot format indication information is configured to indicate that the link formats of each of the N symbols comprised in the target partial slot are the same as link formats of each of first N symbols in 14 symbols comprised in a last full slot.

* * * * *